(12) United States Patent
Yang (10) Patent No.: US 10,807,147 B2
(45) Date of Patent: Oct. 20, 2020

(54) PLATFORM FOR CONSTRAINING A WORKPIECE ON AN X-Y STAGE

(71) Applicants: Korvis Asia Private Limited, Singapore (SG); Korvis Automation (Shanghai) Co. Ltd, Shanghai (CN)

(72) Inventor: Yi Qiang Yang, Shanghai (CN)

(73) Assignees: KORVIS ASIA PRIVATE LIMITED, Singapore (SG); KORVIS AUTOMATION (SHANGHAI) CO. LTD, Shanghai (CN)

(*) Notice: Subject to any disclaimer, the term of this patent is extended or adjusted under 35 U.S.C. 154(b) by 373 days.

(21) Appl. No.: 15/861,843

(22) Filed: Jan. 4, 2018

(65) Prior Publication Data

US 2018/0194095 A1    Jul. 12, 2018

Related U.S. Application Data

(60) Provisional application No. 62/543,624, filed on Aug. 10, 2017, provisional application No. 62/443,156, filed on Jan. 6, 2017.

(51) Int. Cl.
| | |
|---|---|
| *B30B 15/00* | (2006.01) |
| *B23P 19/04* | (2006.01) |
| *B21J 15/32* | (2006.01) |
| *B23P 19/00* | (2006.01) |
| *B23P 19/06* | (2006.01) |
| *B23P 19/02* | (2006.01) |
| *B23P 19/10* | (2006.01) |

(52) U.S. Cl.
CPC ........... *B21J 15/323* (2013.01); *B23P 19/006* (2013.01); *B23P 19/02* (2013.01); *B23P 19/04* (2013.01); *B23P 19/062* (2013.01); *B23P 19/10* (2013.01); *B30B 15/0023* (2013.01)

(58) Field of Classification Search
None
See application file for complete search history.

(56) References Cited

U.S. PATENT DOCUMENTS

| | | | |
|---|---|---|---|
| 2006/0278683 A1* | 12/2006 | Otsuka | B23Q 3/18 228/44.3 |
| 2013/0034408 A1 | 2/2013 | Maloney | |
| 2013/0056514 A1 | 3/2013 | Maloney | |

\* cited by examiner

*Primary Examiner* — Brian D Keller
(74) *Attorney, Agent, or Firm* — Wenderoth, Lind & Ponack, L.L.P.

(57) ABSTRACT

A platform for constraining a workpiece includes x-y stage connected to a base, wherein the x-y stage includes a floor and a y-axis datum and a x-axis datum aligned along a first axis and a second axis perpendicular to the first axis, respectively, and a primary constraint mechanism on the x-y stage. The primary constraint mechanism includes an x-axis wedge, a primary y-axis wedge and a primary z-axis clamp, and a primary linear actuator with a rod extendable and retractable parallel to the second axis. A primary linear actuator slides the x-axis wedge away from the x-axis datum, slides the primary y-axis wedge away from the y-axis datum, and rotates the primary z-axis clamp away from the workpiece. The primary z-axis clamp is attached to a cam with a pinion gear that engages a rack gear connected to the rod of the primary linear actuator.

9 Claims, 12 Drawing Sheets

PLATFORM FOR CONSTRAINING A WORKPIECE ON AN X-Y STAGE

TECHNICAL CONTRIBUTION

The present disclosure relates to workpiece handling. More particularly, the present disclosure relates to a platform for constraining a workpiece on an x-y stage.

BACKGROUND

Keyboards, laptops and other consumer electronics components are assembled from two or more workpieces by connections at multiple locations. The connection can be made by pins, such as the stand alone pin sold under the trademark TACKPIN by PennEngineering Inc or by pins attached toe-to head at severable joints as disclosed in US2013/0034408A1 filed 2011 Jul. 26 entitled "MINIATURE TACK PINS."

Such pins are activated by a puncher typically paired with an anvil. The force from the puncher deforms the pin, acting much like a rivet, to hold two the workpieces together. An example puncher paired with an anvil is disclosed in US2013/0056514A1 filed 2011 Sep. 2 entitled "TACK PIN INSTALLATION PRESS."

SUMMARY

A first embodiment of the invention is an automated pin anvil press for connecting a workpiece pair at a plurality of pin locations with a plurality of pins comprising: (a) a platform; (b) an anvil paired with a puncher; and (c) a position control camera capable of taking a plurality of position alignment images. The platform includes: (i) a base; (ii) an x-y stage including a floor with a central opening, a y-axis datum aligned along a first axis and an x-axis datum aligned along a second axis perpendicular to the first axis; (iii) a primary constraint mechanism on the x-y stage, wherein activation of the primary constraint mechanism constrains at least one workpiece of the workpiece pair on the x-y stage; (iv) an x-axis carriage connecting the x-y stage to the base, wherein activation of an x-axis actuator connected to the x-axis carriage moves the x-y stage parallel to the first axis; and (v) a y-axis carriage connecting the x-y stage to the base, wherein activation of a y-axis actuator connected to the y-axis carriage moves the x-y stage parallel to the second axis perpendicular to the first axis. The anvil includes an anvil tip and an anvil tip holder. The puncher includes a press head and a press actuator, wherein the press actuator has a duty cycle. Each pin is activated within the workpiece pair by a punch force between the press head and the anvil tip during the duty cycle of the press actuator.

In a first alternative of the first embodiment, the automated pin anvil press further comprises a controller unit including a library, a microprocessor and a data bus that is in electrical communication with the primary constraint mechanism, the x-axis carriage, the y-axis carriage, the press actuator and the position control camera. The library includes a plurality of parameter records, each parameter record comprising a workpiece pair datum point and a plurality of pin hole coordinates. The controller unit is capable of accessing the position control camera to determine a current position of the workpiece pairs.

The first embodiment of the first embodiment can also include the following limitations: (a) the puncher includes a load cell capable of measuring the punch force; (b) the controller unit is in electrical communication with the load cell; (c) each of the parameter records includes a punch force tolerance range; and (d) the controller unit is capable of adjusting the duty cycle of the press actuator until the punch force is within the punch force tolerance range.

The first embodiment of the first embodiment can also include the following limitations: (a) the puncher includes a load cell capable of measuring the punch force during the duty cycle of the press actuator; (b) the controller unit is in electrical communication with the load cell; and (c) upon detecting a sudden dip in the punch force during the duty cycle, the controller unit issues an error message that the workpiece pair has a probable cracking event.

The first embodiment of the first embodiment can also include the following limitations: (a) each of the parameter records includes an alignment range; and (b) the controller unit is capable of detecting from at least one position alignment image a misalignment between the workpiece pair and issuing an error message that the alignment range is not met.

A second alternative of the first embodiment further includes a laser and a 3D camera to create a plurality of 3D images after activation of the plurality of pins within each workpiece pair. The 3D camera is oriented to capture a height profile of each of the plurality of pins activated within each workpiece and the height profile is captured using laser triangulation.

A third alternative of the first embodiment further comprises a controller unit in electrical communication with an optical sensor. The optical sensor measures a plurality of workpiece distances between the optical sensor and a plurality of workpiece points proximate to a pin head activated within the workpiece pair. And the controller unit calculates a pin head height for the pin head from the workpiece distances.

The third alternative of the first embodiment can also include the enhancements that: (a) the controller unit groups the workpiece distances into at least one associated planar area; (b) the controller unit averages the workpiece distances for each associated planar area to calculate an average workpiece distance for each associated planar area; (c) the controller unit determines a central area of the pin head; (d) the optical sensor measures a plurality of pin head distances between the optical sensor and a plurality of pin head points proximate to the central area of the pin head; (e) the controller unit averages the pin head distances for the pin head to calculate an average pin head distance; and (f) the controller calculates the pin head height by subtracting the average pin head distance from the average workpiece distance.

The third alternative of the first embodiment can also include the enhancements that: (a) the control unit comprises a library and the library includes a plurality of parameter records with each parameter record comprising a workpiece pair datum point and a plurality of pin hole coordinates; and (b) the controller unit determines the central area of the pin head from the pin hole coordinates of the workpiece pair.

A fourth alternative of the first embodiment further comprises an alignment jig capable of aligning the anvil tip and the press head.

A fifth alternative of the first embodiment further comprises an alignment ring capable of assuring proper installation of the anvil tip.

An sixth alternative of the first embodiment further comprises a bowl feeder capable of feeding a plurality of pins to the press head. It can also include the enhancement that the anvil tip passes through the central opening of the floor to contact a bottom side of the workpiece pair. It can also include the enhancement that the bowl feeder includes a pin presence sensor and a bowl cover.

A second embodiment of the invention is a platform for constraining a workpiece comprising: (a) an x-y stage connected to a base, wherein the x-y stage includes a floor, a y-axis datum aligned along a first axis and an x-axis datum aligned along a second axis perpendicular to the first axis; and (b) a primary constraint mechanism on the x-y stage. The primary constraint mechanism includes: (i) an x-axis wedge, a primary y-axis wedge and a primary z-axis clamp; and (ii) a primary linear actuator with a rod extendable and retractable parallel to the second axis. The extension of the primary linear actuator: (i) slides the x-axis wedge away from the x-axis datum; (ii) slides the primary y-axis wedge away from the y-axis datum; and (iii) rotates the primary z-axis clamp away from the workpiece. The retraction of the primary linear actuator: (i) slides the x-axis wedge toward the x-axis datum, wedging the workpiece against the x-axis datum; (ii) slides the primary y-axis wedge toward the y-axis datum, wedging the workpiece against the y-axis datum; and (iii) rotates the primary z-axis clamp toward the workpiece, clamping the workpiece against the floor. The x-axis wedge is connected to the rod of the primary linear actuator. The primary z-axis clamp is attached to a cam with a pinion gear that engages a rack gear connected to the rod of the primary linear actuator.

A first alternative embodiment of the second embodiment has the following limitations: (a) the primary y-axis wedge includes a spring and a bearing; and (b) the bearing is in contact with a sloped ramp attached to the rod of the primary linear actuator. Though not required, the sloped ramp is adjustable.

In a second alternative embodiment of the second embodiment, the x-axis datum and the y-axis datum are adjustably fixable on the x-y stage.

In a third alternative embodiment of the second embodiment, upon the extension of the primary linear actuator, the workpiece is clamped by the primary z-axis clamp after both: (a) the workpiece is wedged against the x-axis datum; and (b) the workpiece is wedged against the y-axis datum.

In a fourth alternative embodiment of the second embodiment, upon the retraction of the primary linear actuator, the workpiece is released by the primary z-axis clamp before both: (a) the workpiece is released from the x-axis datum; and (b) the workpiece is released from the y-axis datum.

A fifth alternative embodiment of the second embodiment, further comprising a secondary constraint mechanism with a secondary z-axis clamp and a secondary linear actuator, wherein: (a) extension of the secondary linear actuator rotates the secondary z-axis clamp away from the workpiece; and (b) retraction of the secondary linear actuator rotates the secondary z-axis clamp toward the workpiece, clamping the workpiece against the floor.

In a sixth alternative embodiment of the second embodiment: (a) an x-axis carriage connects the x-y stage to the base, wherein activation of an x-axis actuator connected to the x-axis carriage moves the x-y stage parallel to a first axis; and (b) a y-axis carriage connects the x-y stage to the base, wherein activation of a y-axis actuator connected to the y-axis carriage moves the x-y stage parallel to a second axis perpendicular to the first axis.

In a seventh alternative embodiment of the second embodiment: (a) the primary linear actuator is connectable to a controller unit; (b) the controller unit is capable of actuating a workpiece tool; and (c) the controller unit synchronizes actuation of the primary linear actuator and the workpiece tool.

BRIEF DESCRIPTION OF THE DRAWINGS

Embodiments of the present disclosure are described herein with reference to the drawings in which.

DETAILED DESCRIPTION

In the following detailed description, reference is made to the accompanying drawings, which form a part hereof. The illustrative embodiments described in the detailed description, drawings and claims are not meant to be limiting. Other embodiments can be utilized, and other changes can be made, without departing from the spirit or scope of the subject matter presented herein. Unless specified otherwise, the terms "comprising," "comprise," "including" and "include" used herein, and grammatical variants thereof, are intended to represent "open" or "inclusive" language such that they include recited elements but also permit inclusion of additional, un-recited elements. The term "connect," "connected," or "connecting" used herein, and grammatical variants thereof, are intended to represent a linking of two items either directly together or linking them indirectly together.

Components in FIG. 1-12 are numbered as listed in Table 1 below.

TABLE 1

| description of common components | |
|---|---|
| Component | Description |
| 01 | x-y stage |
| 02 | floor |
| 03 | y-axis datum |

TABLE 1-continued description of common components

| Component | Description |
| --- | --- |
| 04 | x-axis datum |
| 05 | central opening |
| 06 | x-axis carriage |
| 07 | y-axis carriage |
| 08 | base |
| 09 | anvil |
| 10 | anvil tip |
| 11 | anvil holder |
| 12 | load cell |
| 13 | position control camera |
| 14 | puncher |
| 15 | press head |
| 16 | press actuator |
| 17 | workpiece tool |
| 18 | secondary z-axis clamp |
| 19 | x-axis wedge |
| 20 | primary y-axis wedge |
| 21 | platform |
| 22 | workpiece pair |
| 23 | primary constraint mechanism |
| 24 | pinion gear |
| 25 | rack gear |
| 26 | cam |
| 27 | primary z-axis clamp |
| 28 | primary linear actuator |
| 29 | sloped ramp |
| 30 | bearing |
| 31 | workpiece |
| 32 | laser |
| 33 | second rod |
| 34 | 3D camera |
| 35 | pin head |
| 36 | central area of the pin head |
| 37 | associated planar areas |
| 38 | secondary linear actuator |
| 39 | secondary constraint mechanism |
| 40 | secondary y-axis wedge |
| 41 | rod |

Figure 1:
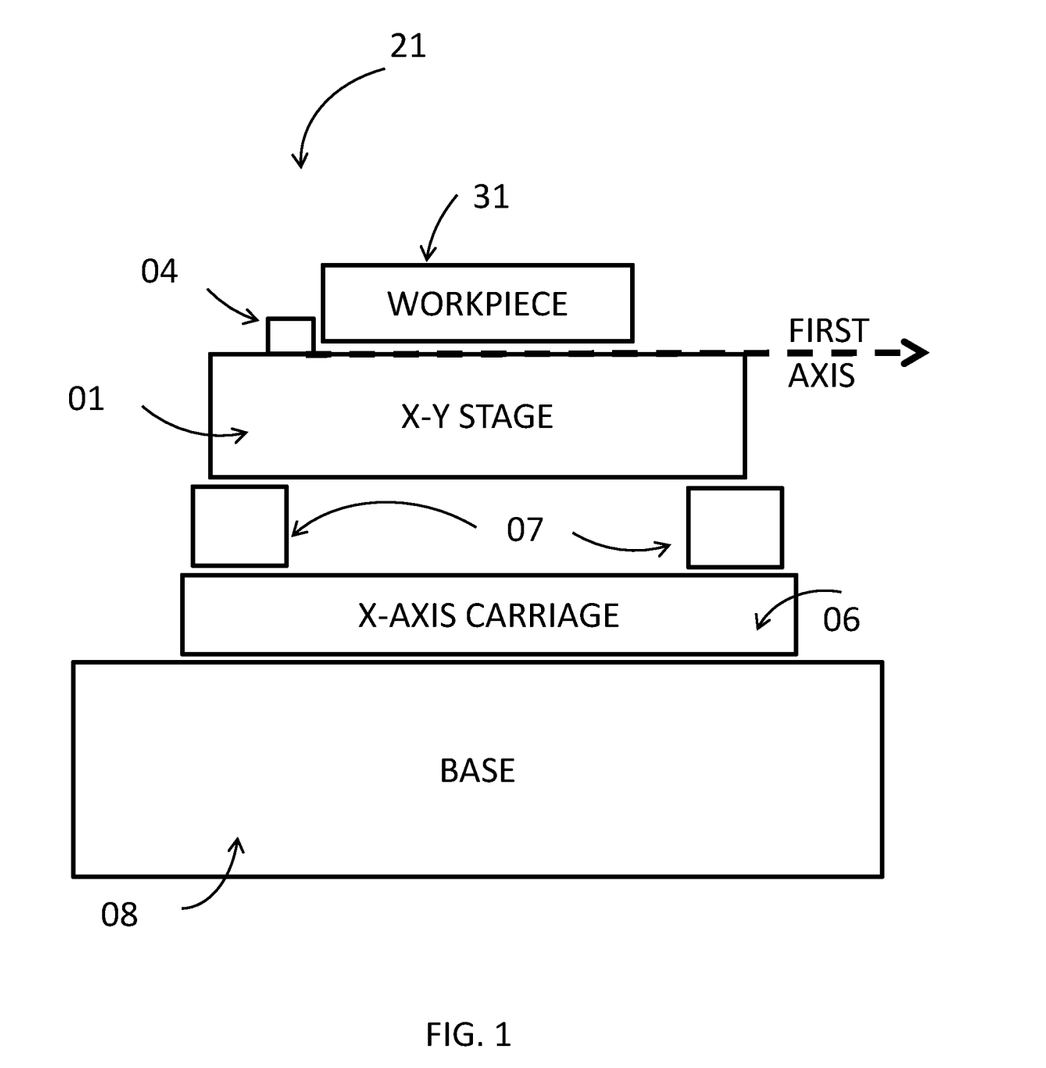
FIG. 1 is a block diagram of the basic components of the platform of an embodiment of the invention.
Figure 2:
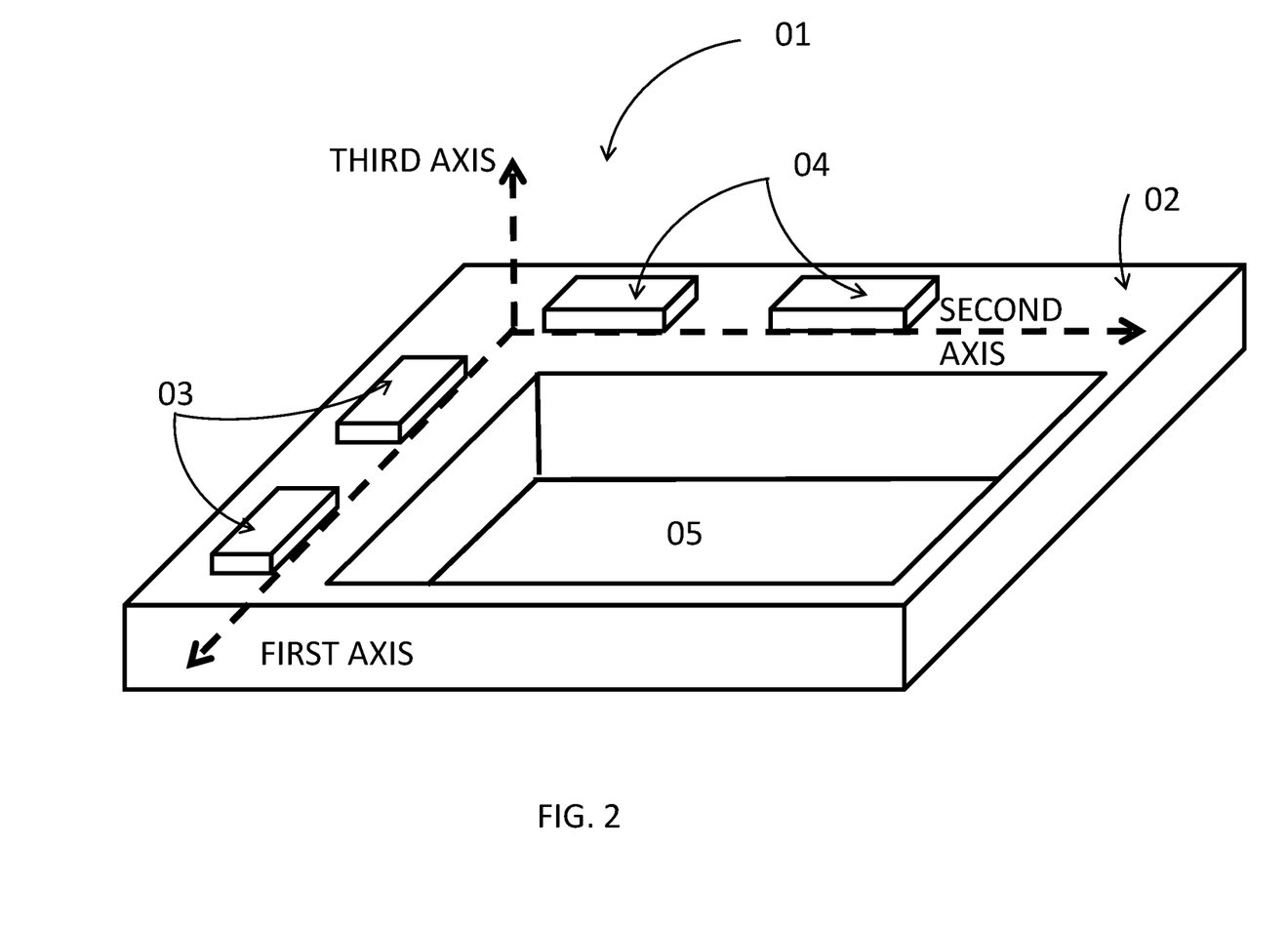
FIG. 2 is a block diagram of the basic components of the x-y stage of an embodiment of the invention.
Figure 3:
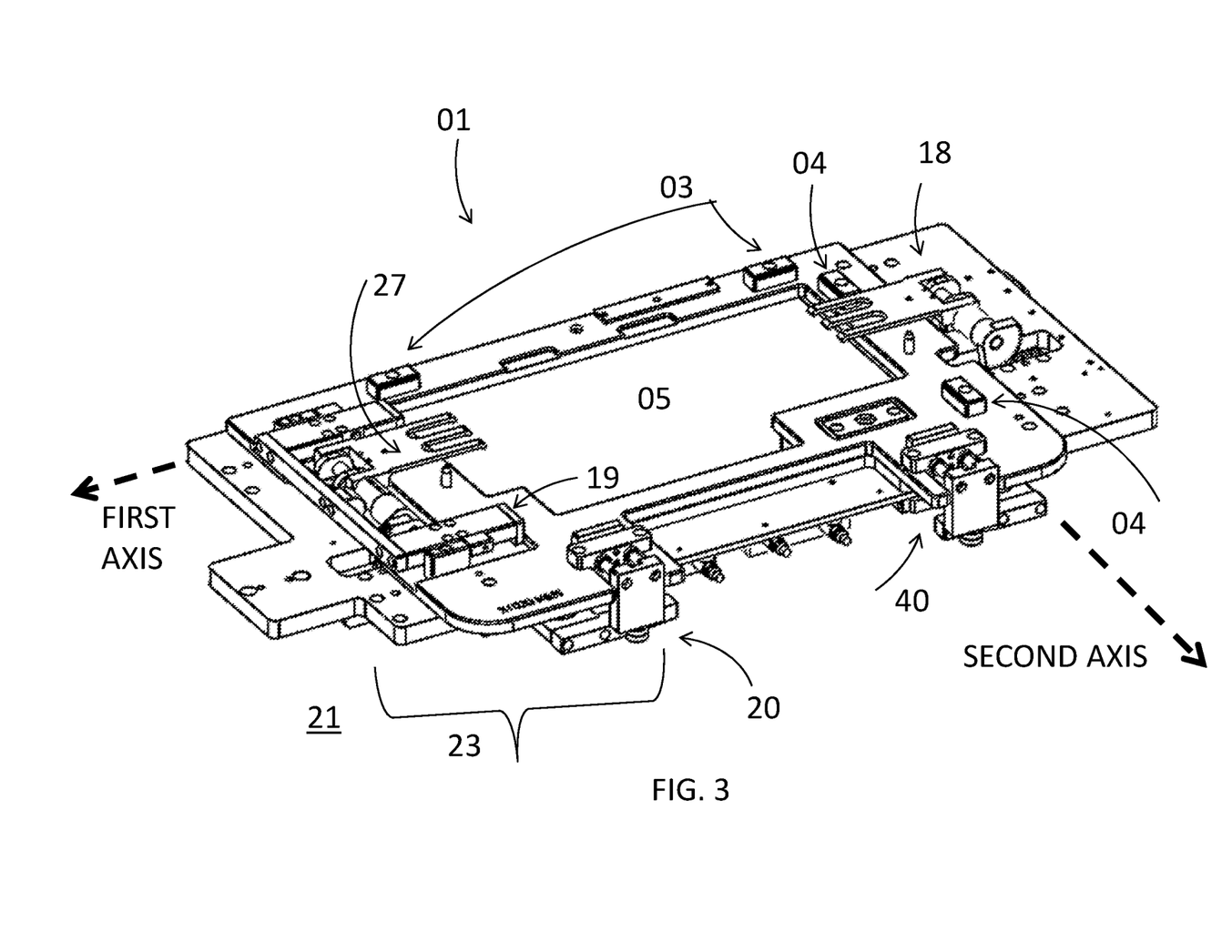
FIG. 3 is an illustration of the x-y stage of an embodiment of the invention.

FIGS. 1-3 include various illustrated perspectives of the x-y stage 01, showing the connection of the x-y stage 01 to other components. In FIGS. 1-3 the term workpiece 31 will be used, though the concepts apply equally to a workpiece pair 22. The term workpiece 31 is meant to be one or more articles for manufacture that are held by the primary constraint mechanism 23 upon an x-y stage 01, where they can be worked upon by a workpiece tool 17, inspection tool, testing tool or other tool. A workpiece pair 22 is directed specifically a pair of workpieces 31 that are worked on together when held by the primary constraint mechanism 23 on the x-y stage 01. The workpiece pair 22 can be two components used in a laptop computer, a keyboard or any other workpieces 31 that need to be moved together for assembly, testing or other work. In the first embodiment of the invention, the workpiece pair 22 is worked on by an automated pin anvil press. As used in this patent, a workpiece 31 is meant to include a single workpiece 31 and also a workpiece pair 22.

FIG. 1 is a block diagram of the basic components of the platform 21 of an embodiment of the invention including the x-y stage 01. The platform 21 includes a base 08 with an x-axis carriage 06 connected atop. Atop the x-axis carriage 06 is the perpendicularly arranged y-axis carriage 07. Atop the y-axis carriage 07 is the x-y stage 01. The x-y stage 01 can move along a first axis or (not shown) a second axis. Atop the x-y stage 01 is a workpiece 31. The workpiece 31 is aligned against an x-axis datum 04 and (not shown) a y-axis datum 03. The x-axis carriage 06 and y-axis are capable of moving the workpiece 31 to a specific coordinate location.

FIG. 2 is a block diagram of the basic components of the x-y stage 01 of an embodiment of the invention. The x-y stage 01 includes an x-axis datum 04 aligned along a second axis and a y-axis datum 03 aligned along a first axis. The first axis is perpendicular to the second axis. The third axis is perpendicular to the first axis and the second axis. The x-y stage 01 has a central opening 05. The workpiece 31 (not shown) is wedged against the x-axis datum 04 and the y-axis datum 03 to align the workpiece 31 for tooling.

FIG. 3 is an illustration of the x-y stage 01 of an embodiment of the invention. The x-y stage 01 includes an x-axis datum 04 aligned along the second axis, a y-axis datum 03 aligned along the first axis, a primary constraint mechanism 23 with an x-axis wedge 19, a primary y-axis wedge 20, a primary z-axis clamp 27, a secondary z-axis clamp 18 and a secondary y-axis wedge 40. The x-y stage 01 has a central opening 05. The x-axis wedge 19 slides and constrains the workpiece 31 (not shown) against the x-axis datum 04. The primary y-axis wedge 20 slides and constrains the workpiece 31 (not shown) against the y-axis datum 03. The primary z-axis clamp 27 and the secondary z-axis clamp 18 constrain the workpiece 31 against the x-y-stage.

Figure 4:
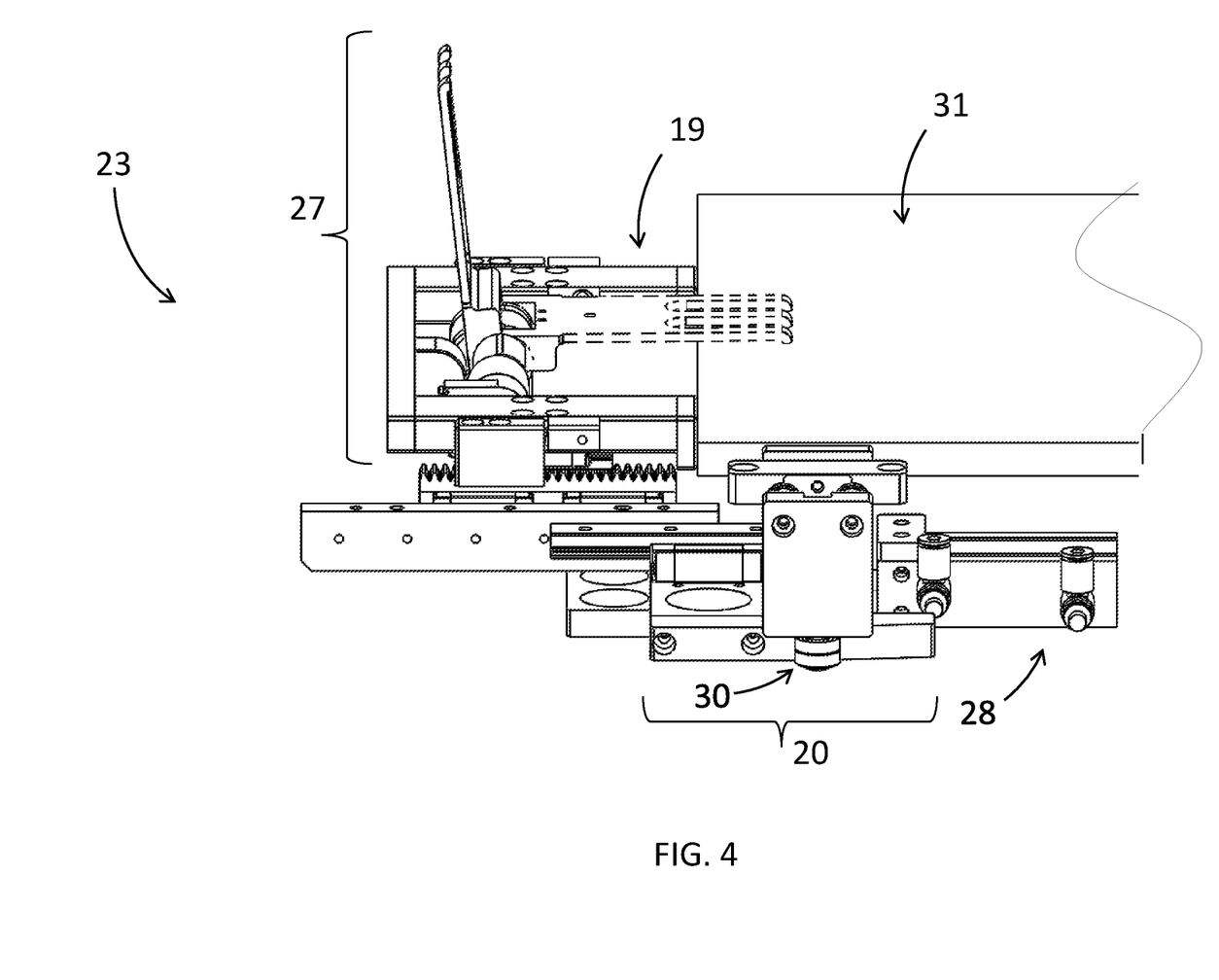
FIG. 4 illustrates a side view of the primary constraint mechanism of an embodiment of the invention engaging a workpiece.

FIG. 4 illustrates a side view of the primary constraint mechanism 23 of an embodiment of the invention engaging a workpiece 31. The primary z-axis clamp 27 is shown in the disengaged, upright position and in the engaged position (dotted lines) clamping the workpiece 31. The x-axis wedge 19 is also illustrated, pressed flush against the workpiece 31. The primary y-axis wedge 20 and a view of the bearing 30 are also illustrated. The primary z-axis clamp 27, the x-axis wedge 19 and the primary y-axis wedge 20 are all activated by the same primary linear actuator 28 with the movement of a rod 41 attached to the primary linear actuator 28.

Figure 5:
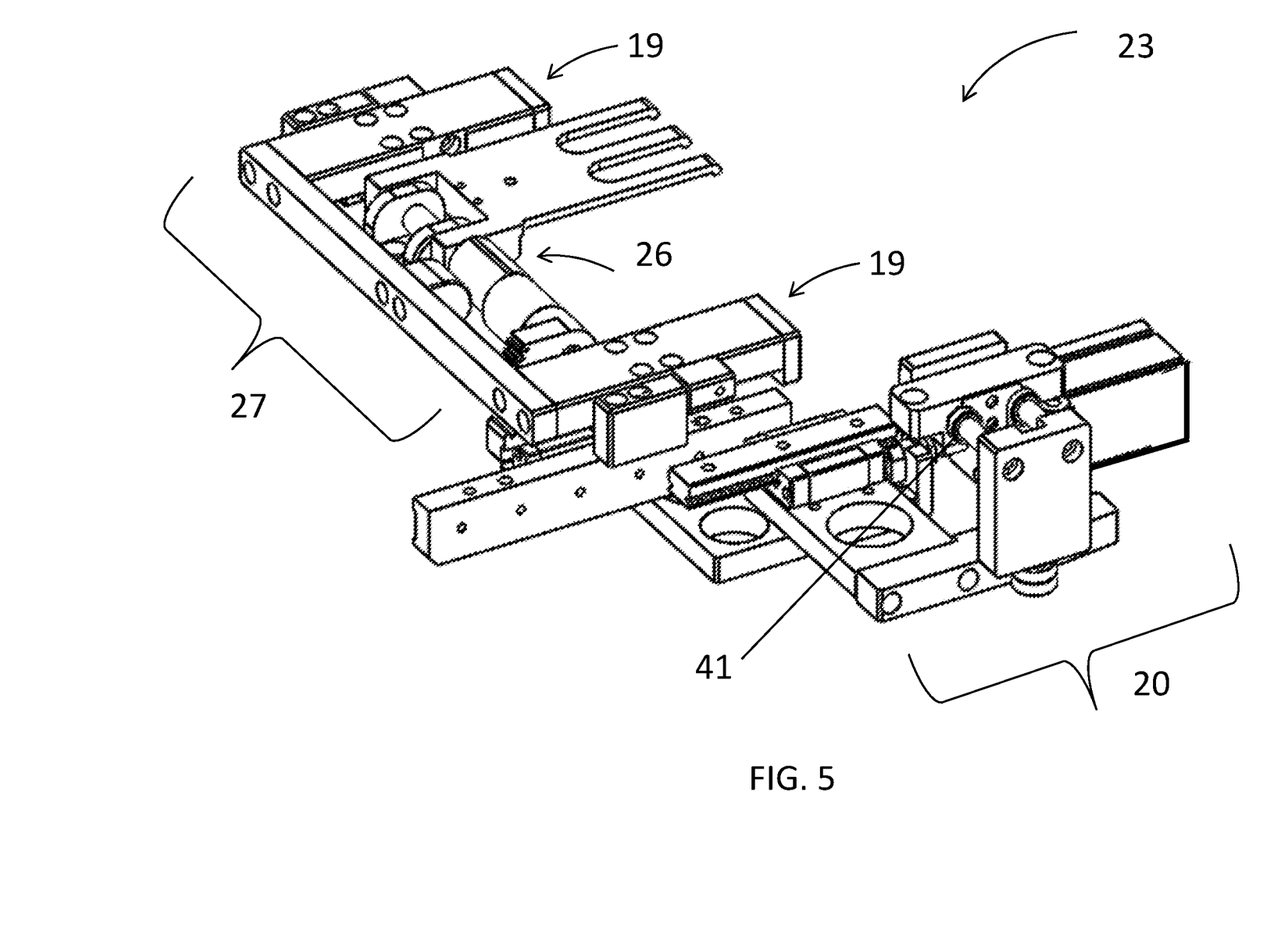
FIG. 5 illustrates a top perspective view of the primary constraint mechanism of an embodiment of the invention.

FIG. 5 illustrates a top perspective view of the primary constraint mechanism 23 of an embodiment of the invention. FIG. 5 illustrates the primary z-axis clamp 27, the x-axis wedge 19, the primary y-axis wedge 20 and the cam 26. The primary z-axis clamp 27 is shown in the disengaged, upright position and in the engaged position (dotted lines) clamping the workpiece 31. A pinion gear 24 enmeshed with a rack gear 25 is illustrated, this combination of mechanical parts transfers the linear motion of the primary linear actuator 28 into the rotational movement of the primary z-axis clamp 27. The primary y-axis wedge 20 is also illustrated, pressed flush against the workpiece 31, with a bearing 30 and a sloped ramp 29. The linear movement of the sloped ramp 29 (actuated by the primary linear actuator 28) is translated to a perpendicular linear motion by the force of the sloped ramp 29 onto the bearing 30. E.g., the bearing 30 spins along the inclined plane of the sloped ramp 29 as the sloped ramp 29 is moved by the primary linear actuator 28 (moving in a direction parallel to the first axis) and the inclined ramp has a y-component that forces the primary y-axis wedge 20 in a direction parallel to the axis.

Figure 6:
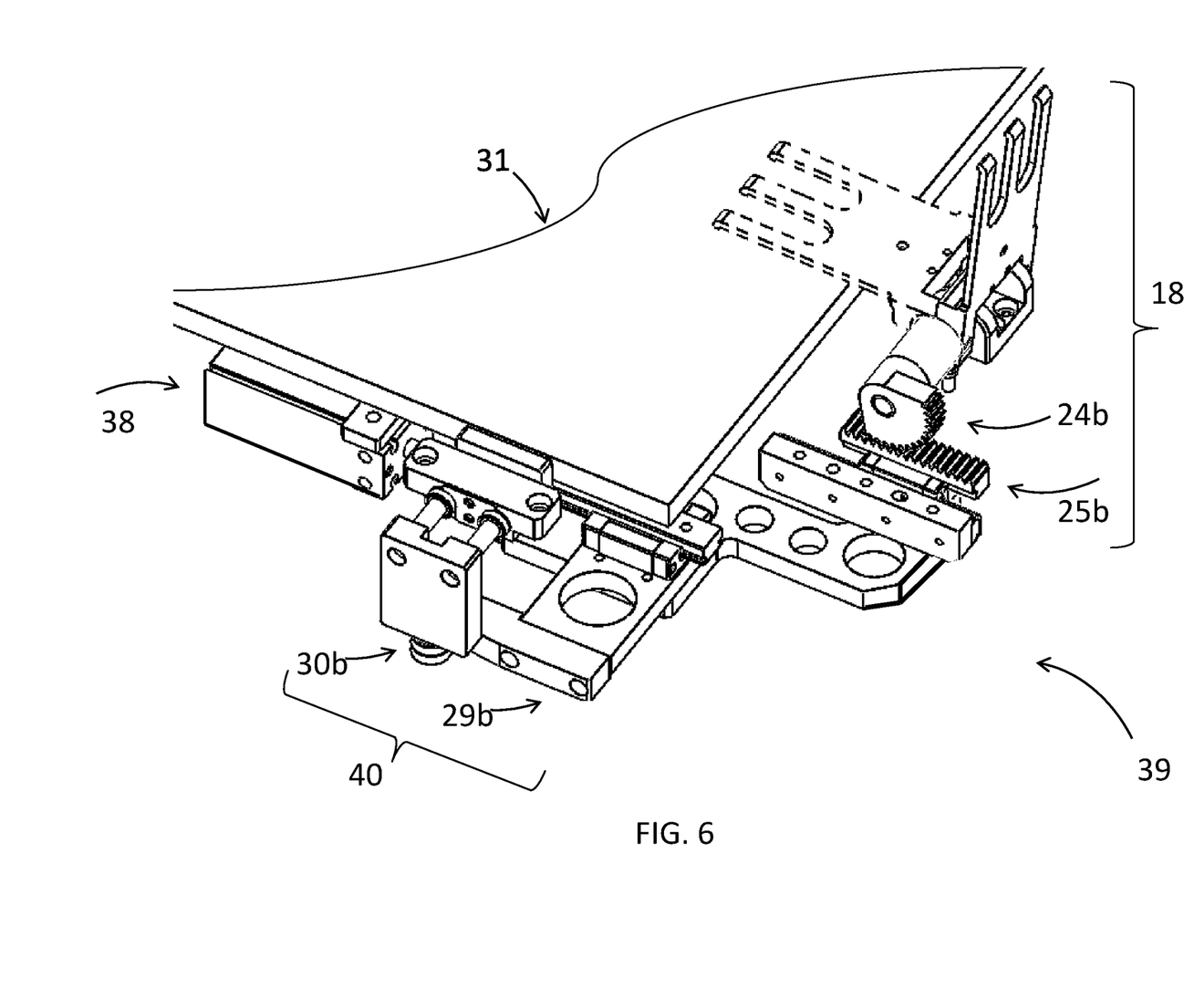
FIG. 6 illustrates a top perspective view of the secondary constraint mechanism of an embodiment of the invention engaging a workpiece.
Figure 7:
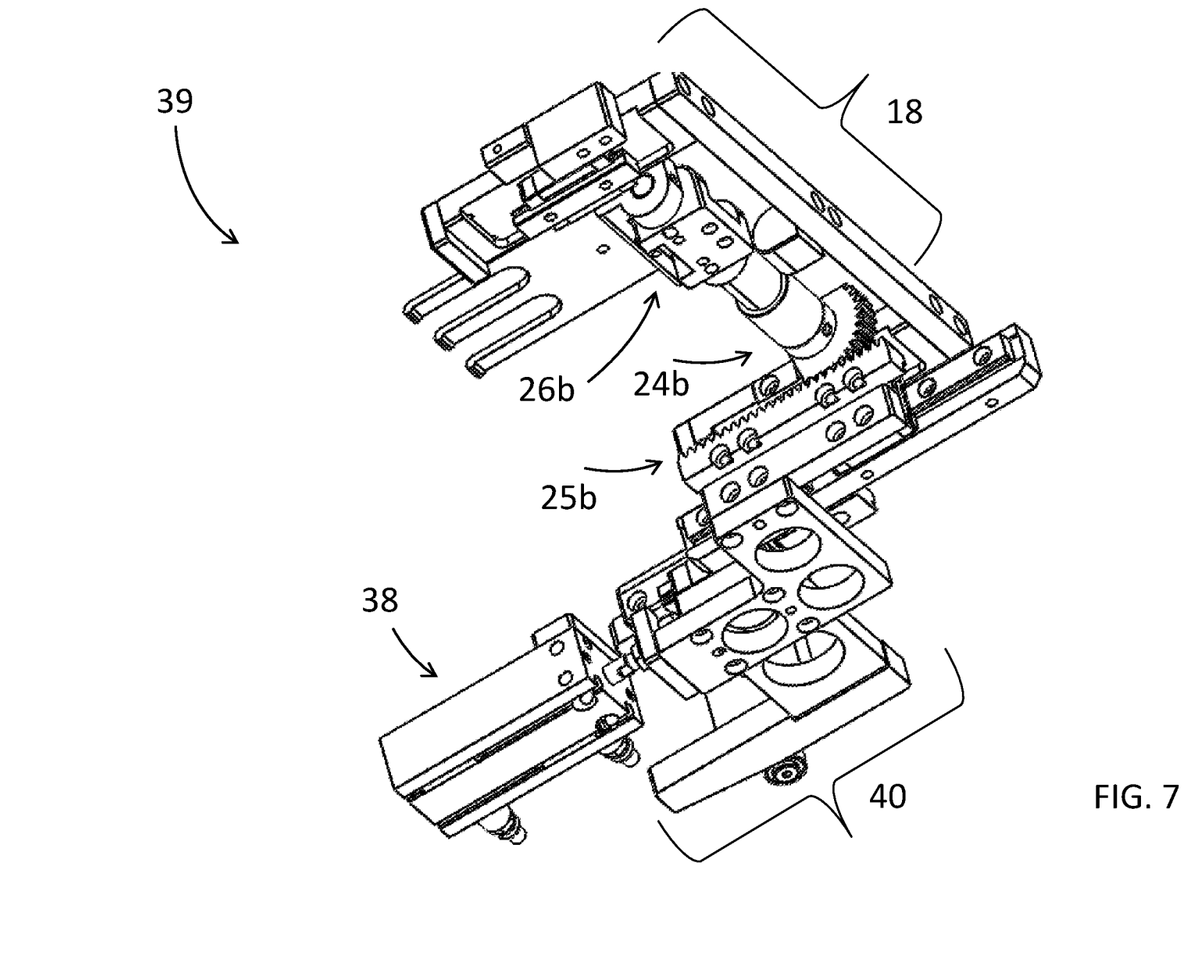
FIG. 7 illustrates a bottom perspective view of the secondary constraint mechanism of an embodiment of the invention.
Figure 8:
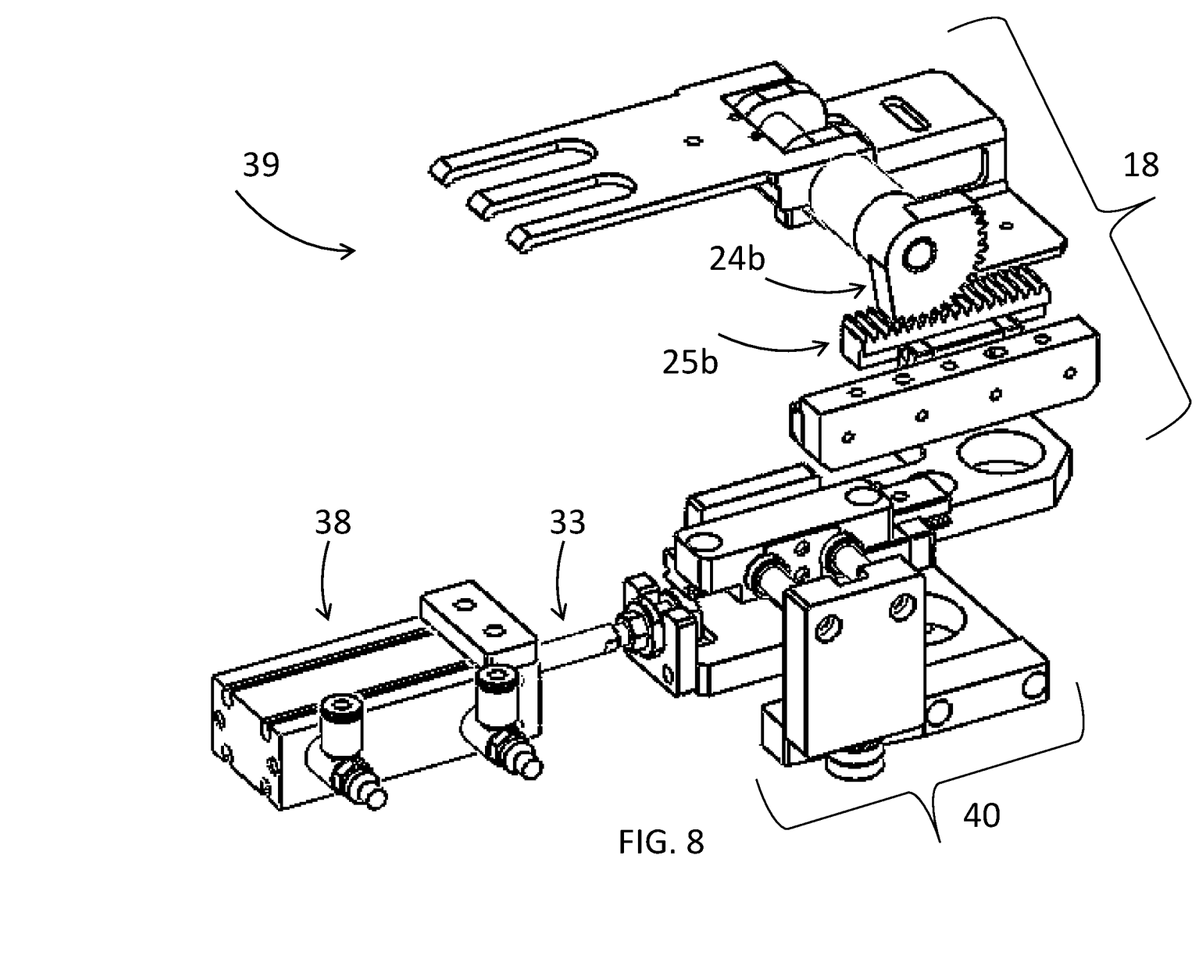
FIG. 8 illustrates a simplified perspective view of the secondary constraint mechanism of an embodiment of the invention.

FIGS. 6-8 illustrate the components of a secondary constraint mechanism 39. FIG. 6 illustrates a top perspective view of the secondary constraint mechanism 39 of an embodiment of the invention engaging a workpiece 31. FIG. 7 illustrates a bottom perspective view of the secondary constraint mechanism 39 of an embodiment of the invention. FIG. 8 illustrates a simplified perspective view of the secondary constraint mechanism 39 of an embodiment of the invention. The secondary z-axis clamp 18 is shown in the disengaged, upright position and in the engaged position (dotted lines) clamping the workpiece 31. A second pinion gear 24*b* enmeshed with a second rack gear 25*b* is illustrated, this combination of mechanical parts transfers the linear motion of the secondary linear actuator 38 into the rotational movement of the secondary z-axis clamp 18. The secondary y-axis wedge 40 is also illustrated, pressed flush against the workpiece 31, with a second bearing 30*b* and a second sloped ramp 29*b*. The linear movement of the second sloped ramp 29*b* (actuated by a second rod 33 attached to the secondary linear actuator 38) is translated to a perpendicular linear motion by the force of the second sloped ramp 29*b* onto the second bearing 30*b*. E.g., the second bearing 30*b* spins along the inclined plane of the second sloped ramp 29*b* as the second sloped ramp 29*b* is moved by the secondary linear actuator 38 (moving in a direction parallel to the first axis) and the inclined ramp has a y-component that forces the secondary y-axis wedge 40 in a direction parallel to the second axis.

Figure 9:
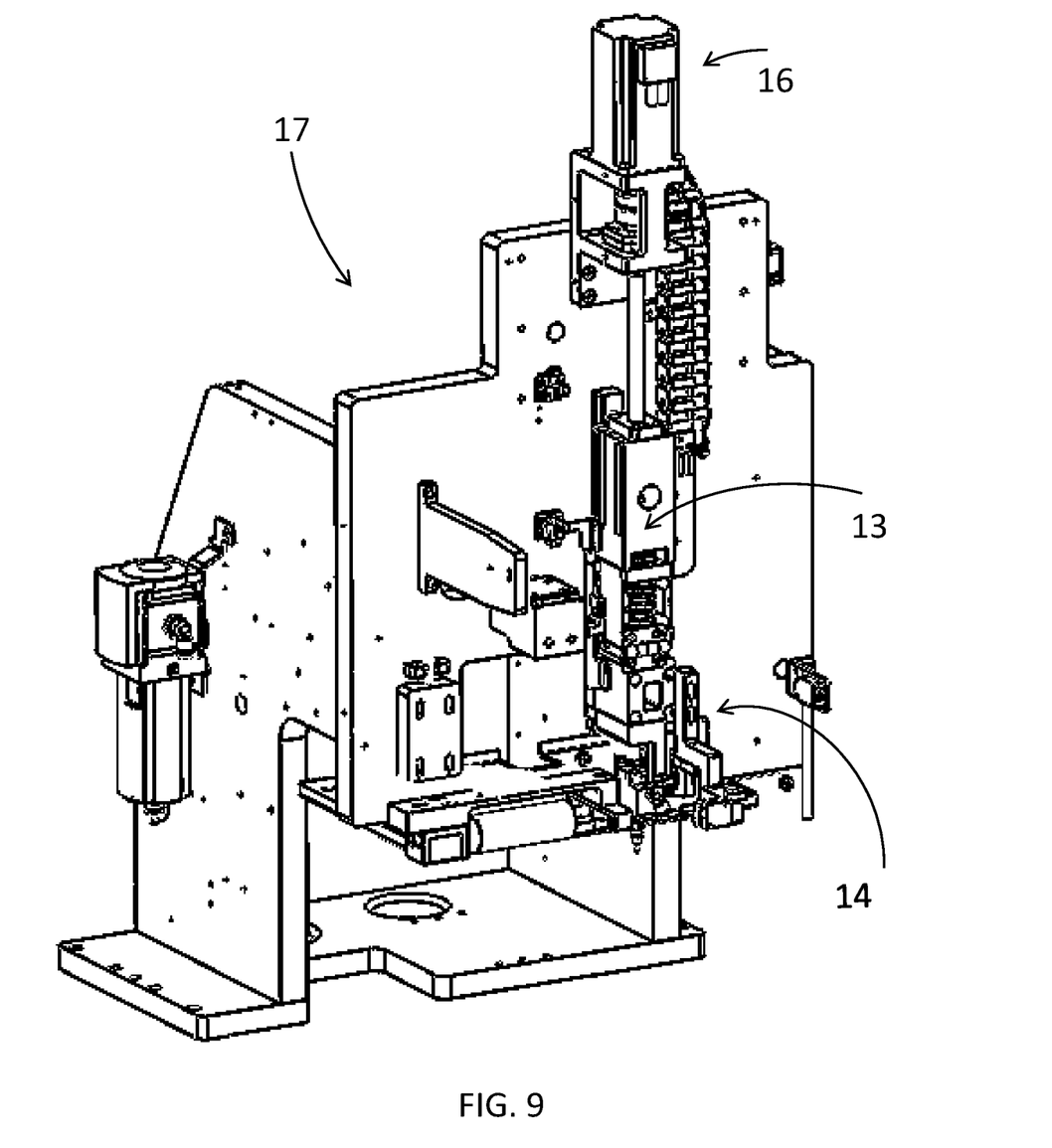
FIG. 9 illustrates a side perspective view of a workpiece tool with a position control camera and a puncher in an embodiment of the invention.
Figure 10:
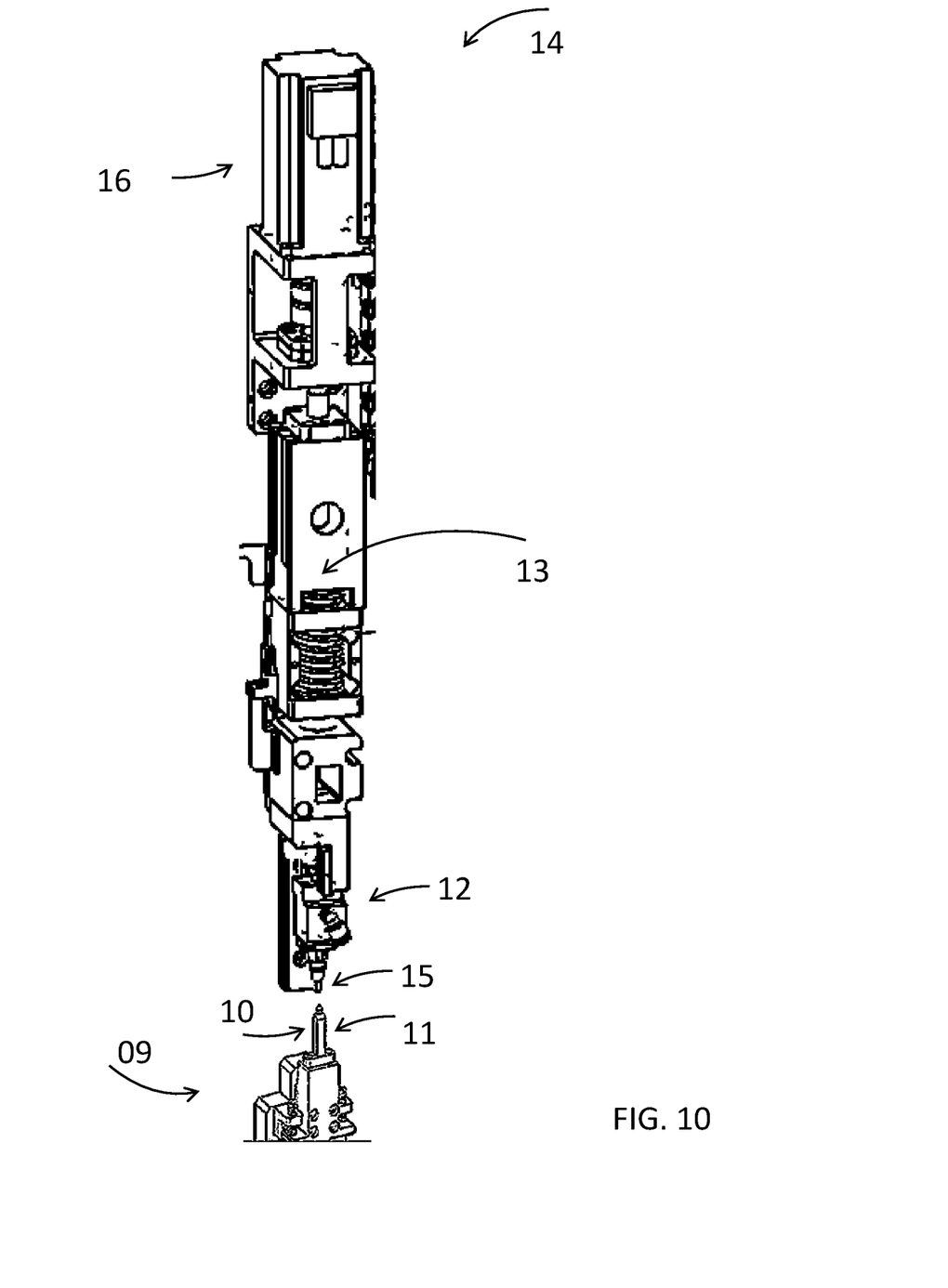
FIG. 10 illustrates a side perspective view of the puncher aligned with an anvil in an embodiment of the invention.

FIG. 9 illustrates a side perspective view of a workpiece tool 17 with a position control camera 13, a press actuator 16 and a puncher 14 in an embodiment of the invention. FIG. 10 illustrates a side perspective view of the puncher 14 aligned with an anvil 09 in an embodiment of the invention. The workpiece tool 17 of FIG. 9 is paired with an anvil 09 as illustrated in FIG. 10. E.g., the puncher 14 can be directed downward onto a workpiece pair 22 (not shown) and the anvil 09 can support the workpiece pair 22 from the bottom. The anvil 09 has an anvil tip 10 and an anvil holder 11. The support from the bottom by the anvil 09 prevents cracking of components in the workpiece pair 22 because the force of the puncher 14 is not absorbed completely by the workpiece pair 22 (which can stretched across a central opening 05). The position control camera 13 can be mounted on the puncher 14 for simplicity, as the relevant location for fine positioning of the workpiece 31 will be at the exact location of potential impact between the puncher 14 and the workpiece 31. (As stated earlier, discussion of workpiece 31 in this specification is meant to also include a workpiece pair 22). A load cell 12 can be located between the press actuator 16 and the press head 15 of the puncher 14 to measure the punch force and provide feedback to a controller unit (not shown) in electrical communication with the load cell 12.

Figure 11:
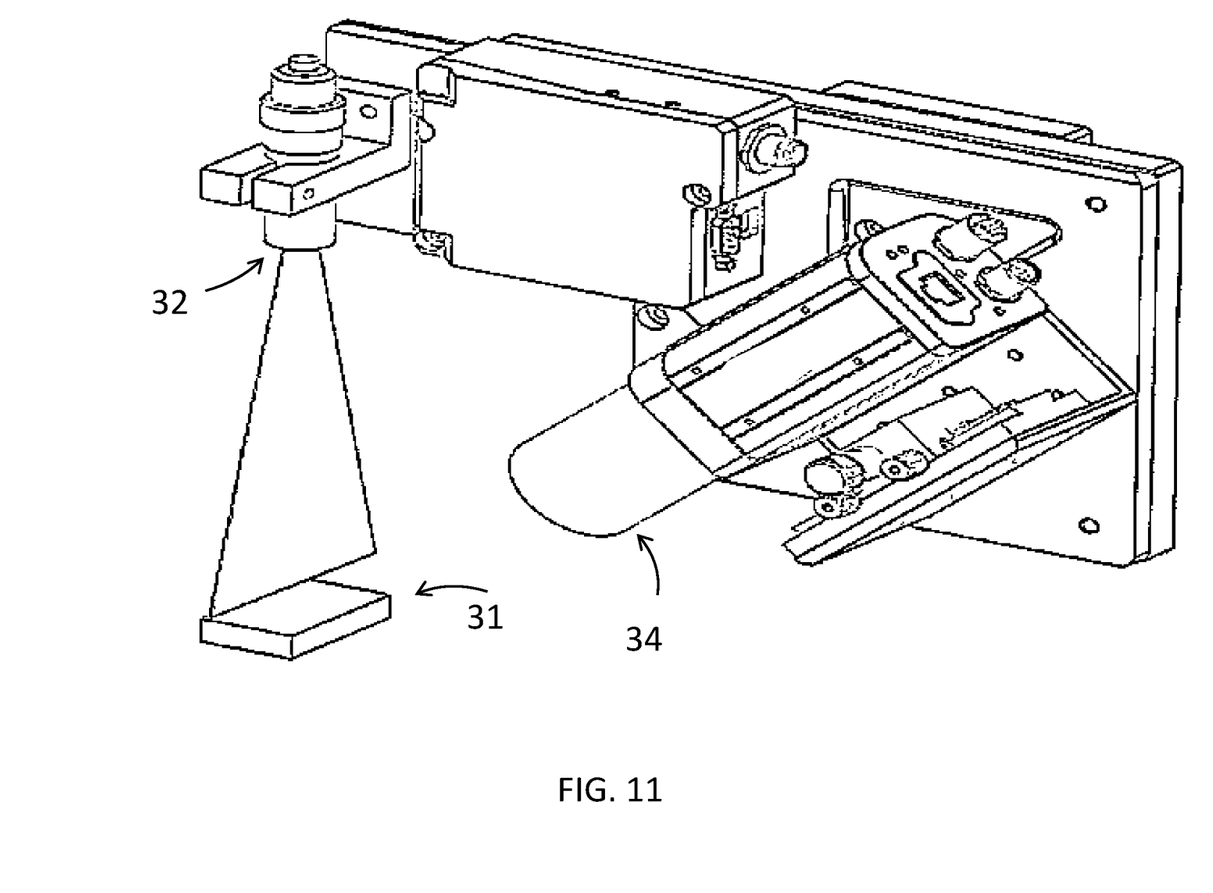
FIG. 11 illustrates a side perspective view of a 3D camera and laser aimed at a workpiece in an embodiment of the invention.

FIG. 11 illustrates a side perspective view of a 3D camera 34 and laser 32 aimed at a workpiece 31 in an embodiment of the invention. The laser 32 is directed at a workpiece 31 and the 3D camera 34 is directed at the location of impact of the laser 32 on the workpiece 31.

Figure 12:
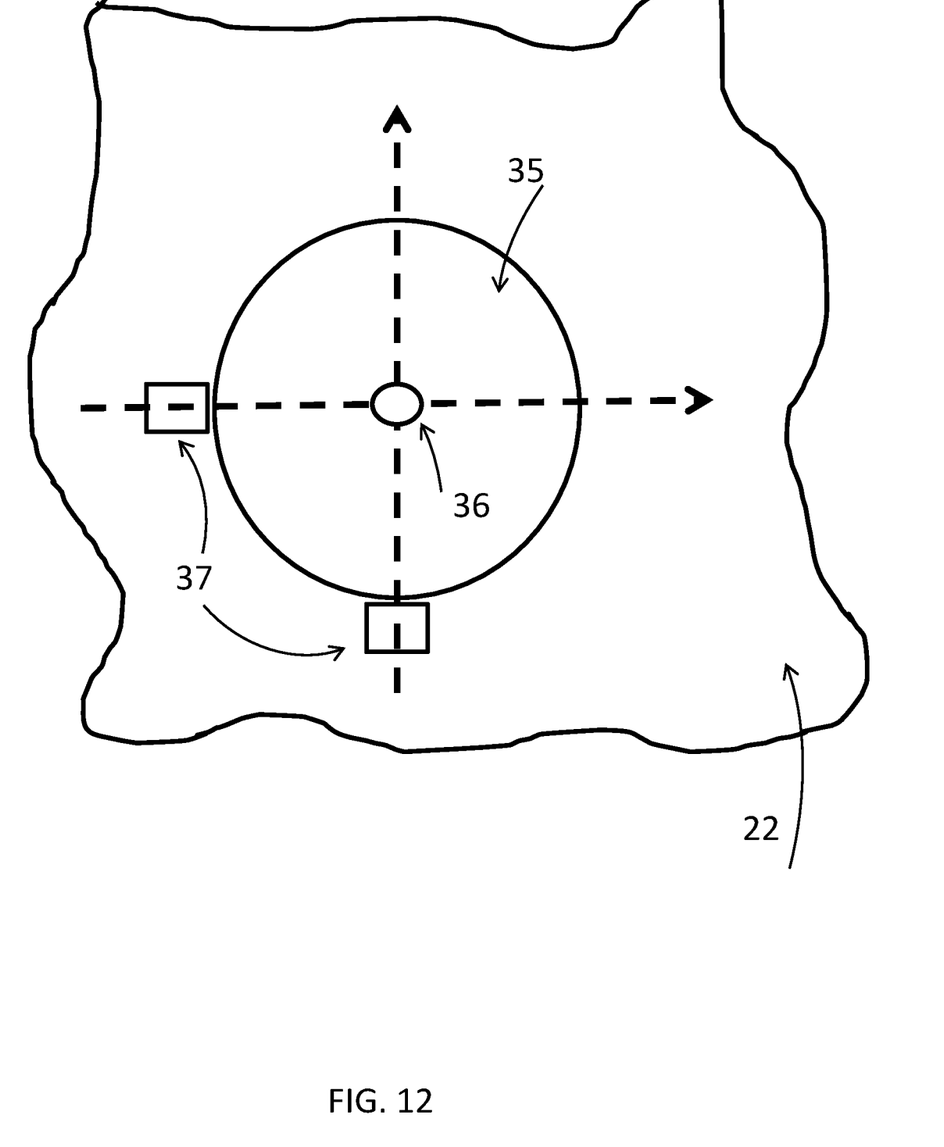
FIG. 12 illustrates a top view of a workpiece pair with a pin activated within the workpiece pair in an embodiment of the invention with a plurality of associated associated planar areas and a central area of the pin head.

FIG. 12 illustrates a top view of a workpiece pair 22 with a pin activated within the workpiece pair 22 in an embodiment of the invention with a plurality of associated associated planar areas 37 and a central area 36 of the pin head 35. In FIG. 12, the term workpiece pair 22 is used because the pin head 35 is the topmost portion of one of many pins holding the workpiece pair 22 together.

A first embodiment of the invention is an automated pin anvil press for connecting a workpiece pair 22 at a plurality of pin locations with a plurality of pins comprising: (a) a platform 21; (b) an anvil 09 paired with a puncher 14; and (c) a position control camera 13 capable of taking a plurality of position alignment images. The platform 21 includes: (i) a base 08; (ii) an x-y stage 01 including a floor 02 with a central opening 05, a y-axis datum 03 aligned along a first axis and an x-axis datum 04 aligned along a second axis perpendicular to the first axis; (iii) a primary constraint mechanism 23 on the x-y stage 01, wherein activation of the primary constraint mechanism 23 constrains at least one workpiece 31 of the workpiece pair 22 on the x-y stage 01; (iv) an x-axis carriage 06 connecting the x-y stage 01 to the base 08, wherein activation of an x-axis actuator connected to the x-axis carriage 06 moves the x-y stage 01 parallel to the first axis; and (v) a y-axis carriage 07 connecting the x-y stage 01 to the base 08, wherein activation of a y-axis actuator connected to the y-axis carriage 07 moves the x-y stage 01 parallel to the second axis perpendicular to the first axis. The anvil 09 includes an anvil tip 10 and an anvil holder 11. The puncher 14 includes a press head 15 and a press actuator 16, wherein the press actuator 16 has a duty cycle. Each pin is activated within the workpiece pair 22 by a punch force between the press head 15 and the anvil tip 10 during the duty cycle of the press actuator 16.

In a first alternative of the first embodiment, the automated pin anvil press further comprises a controller unit including a library, a microprocessor and a data bus that is in electrical communication with the primary constraint mechanism 23, the x-axis carriage 06, the y-axis carriage 07, the press actuator 16 and the position control camera 13. The library includes a plurality of parameter records, each parameter record comprising a workpiece pair 22 datum point and a plurality of pin hole coordinates. The controller unit is capable of accessing the position control camera 13 to determine a current position of the workpiece pair 22.

The first embodiment of the first embodiment can also include the following limitations: (a) the puncher 14 includes a load cell 12 capable of measuring the punch force; (b) the controller unit is in electrical communication with the load cell 12; (c) each of the parameter records includes a punch force tolerance range; and (d) the controller unit is capable of adjusting the duty cycle of the press actuator 16 until the punch force is within the punch force tolerance range.

The first embodiment of the first embodiment can also include the following limitations: (a) the puncher 14 includes a load cell 12 capable of measuring the punch force during the duty cycle of the press actuator 16; (b) the controller unit is in electrical communication with the load cell 12; and (c) upon detecting a sudden dip in the punch force during the duty cycle, the controller unit issues an error message that the workpiece pair 22 has a probable cracking event.

The first embodiment of the first embodiment can also include the following limitations: (a) each of the parameter records includes an alignment range; and (b) the controller unit is capable of detecting from at least one position alignment image a misalignment between the workpiece pair 22 and issuing an error message that the alignment range is not met.

A second alternative of the first embodiment further includes a laser 32 and a 3D camera 34 to create a plurality of 3D images after activation of the plurality of pins within each workpiece pair 22. The 3D camera 34 is oriented to capture a height profile of each of the plurality of pins activated within each workpiece 31 and the height profile is captured using laser triangulation.

A third alternative of the first embodiment further comprises a controller unit in electrical communication with an optical sensor. The optical sensor measures a plurality of workpiece 31 distances between the optical sensor and a plurality of workpiece points proximate to a pin head 35 activated within the workpiece pair 22. And the controller unit calculates a pin head 35 height for the pin head 35 from the workpiece distances.

The third alternative of the first embodiment can also include the enhancements that: (a) the controller unit groups the workpiece distances into at least one associated planar area 37; (b) the controller unit averages the workpiece distances for each associated planar area 37 to calculate an average workpiece distance for each associated planar area 37; (c) the controller unit determines a central area 36 of the pin head 35; (d) the optical sensor measures a plurality of pin head 35 distances between the optical sensor and a plurality of pin head 35 points proximate to the central area 36 of the pin head 35; (e) the controller unit averages the pin head 35 distances for the pin head 35 to calculate an average pin head distance; and (f) the controller calculates the pin head height by subtracting the average pin head distance from the average workpiece distance.

The third alternative of the first embodiment can also include the enhancements that: (a) the control unit comprises a library and the library includes a plurality of parameter records with each parameter record comprising a workpiece pair 22 datum point and a plurality of pin hole coordinates; and (b) the controller unit determines the central area 36 of the pin head 35 from the pin hole coordinates of the workpiece pair 22.

A fourth alternative of the first embodiment further comprises an alignment jig capable of aligning the anvil tip 10 and the press head 15.

A fifth alternative of the first embodiment further comprises an alignment ring capable of assuring proper installation of the anvil tip 10.

An sixth alternative of the first embodiment further comprises a bowl feeder capable of feeding a plurality of pins to the press head 15. It can also include the enhancement that the anvil tip 10 passes through the central opening 05 of the floor 02 to contact a bottom side of the workpiece pair 22. It can also include the enhancement that the bowl feeder includes a pin presence sensor and a bowl cover.

A second embodiment of the invention is a platform 21 for constraining a workpiece 31 comprising: (a) an x-y stage 01 connected to a base 08, wherein the x-y stage 01 includes a floor 02, a y-axis datum 03 aligned along a first axis and an x-axis datum 04 aligned along a second axis perpendicular to the first axis; and (b) a primary constraint mechanism 23 on the x-y stage 01. The primary constraint mechanism 23 includes: (i) an x-axis wedge 19, a primary y-axis wedge 20 and a primary z-axis clamp 27; and (ii) a primary linear actuator 28 with a rod extendable and retractable parallel to the second axis. The extension of the primary linear actuator 28: (i) slides the x-axis wedge 19 away from the x-axis datum 04; (ii) slides the primary y-axis wedge 20 away from the y-axis datum 03; and (iii) rotates the primary z-axis clamp 27 away from the workpiece 31. The retraction of the primary linear actuator 28: (i) slides the x-axis wedge 19 toward the x-axis datum 04, wedging the workpiece 31 against the x-axis datum 04; (ii) slides the primary y-axis wedge 20 toward the y-axis datum 03, wedging the workpiece 31 against the y-axis datum 03; and (iii) rotates the primary z-axis clamp 27 toward the workpiece 31, clamping the workpiece 31 against the floor 02. The x-axis wedge 19 is connected to the rod of the primary linear actuator 28. The primary z-axis clamp 27 is attached to a cam 26 with a pinion gear 24 that engages a rack gear 25 connected to the rod of the primary linear actuator 28.

A first alternative embodiment of the second embodiment has the following limitations: (a) the primary y-axis wedge 20 includes a spring and a bearing 30; and (b) the bearing 30 is in contact with a sloped ramp 29 attached to the rod of the primary linear actuator 28. Though not required, the sloped ramp 29 is adjustable.

In a second alternative embodiment of the second embodiment, the x-axis datum 04 and the y-axis datum 03 are adjustably fixable on the x-y stage 01.

In a third alternative embodiment of the second embodiment, upon the extension of the primary linear actuator 28, the workpiece 31 is clamped by the primary z-axis clamp 27 after both: (a) the workpiece 31 is wedged against the x-axis datum 04; and (b) the workpiece 31 is wedged against the y-axis datum 03.

In a fourth alternative embodiment of the second embodiment, upon the retraction of the primary linear actuator 28, the workpiece 31 is released by the primary z-axis clamp 27 before both: (a) the workpiece 31 is released from the x-axis datum 04; and (b) the workpiece 31 is released from the y-axis datum 03.

A fifth alternative embodiment of the second embodiment, further comprises a secondary constraint mechanism 39 with a secondary z-axis clamp 18 and a secondary linear actuator 38, wherein: (a) extension of the secondary linear actuator rotates the secondary z-axis clamp 18 away from the workpiece 31; and (b) retraction of the secondary linear actuator rotates the secondary z-axis clamp 18 toward the workpiece 31, clamping the workpiece 31 against the floor 02.

In a sixth alternative embodiment of the second embodiment: (a) an x-axis carriage 06 connects the x-y stage 01 to the base 08, wherein activation of an x-axis actuator connected to the x-axis carriage 06 moves the x-y stage 01 parallel to a first axis; and (b) a y-axis carriage 07 connects the x-y stage 01 to the base 08, wherein activation of a y-axis actuator connected to the y-axis carriage 07 moves the x-y stage 01 parallel to a second axis perpendicular to the first axis.

In a seventh alternative embodiment of the second embodiment: (a) the primary linear actuator 28 is connectable to a controller unit; (b) the controller unit is capable of actuating a workpiece tool 17; and (c) the controller unit synchronizes actuation of the primary linear actuator 28 and the workpiece tool 17.

The primary linear actuator 28, the secondary linear actuator and press actuator 16 can be pneumatic cylinders, solenoids, electric motors or other common devices designed for robust repetitive linear motion.

While various aspects and embodiments have been disclosed herein, it will be apparent that various other modifications and adaptations of the invention will be apparent to the person skilled in the art after reading the foregoing disclosure without departing from the spirit and scope of the invention and it is intended that all such modifications and adaptations come within the scope of the appended claims. The various aspects and embodiments disclosed herein are for purposes of illustration and are not intended to be limiting, with the true scope and spirit of the invention being indicated by the appended claims.

I claim:

1. A platform for constraining a workpiece comprising:
   (a) an x-y stage connected to a base, wherein the x-y stage includes a floor, a y-axis datum aligned along a first axis and an x-axis datum aligned along a second axis perpendicular to the first axis;
   (b) a primary constraint mechanism on the x-y stage including:
   (i) an x-axis wedge, a primary y-axis wedge and a primary z-axis clamp;
   (ii) a primary linear actuator with a rod extendable and retractable parallel to the second axis;
   (c) wherein extension of the primary linear actuator:
   (i) slides the x-axis wedge away from the x-axis datum;
   (ii) slides the primary y-axis wedge away from the y-axis datum;

(iii) rotates the primary z-axis clamp away from the workpiece;

(d) wherein retraction of the primary linear actuator:
   (i) slides the x-axis wedge toward the x-axis datum, wedging the workpiece against the x-axis datum;
   (ii) slides the primary y-axis wedge toward the y-axis datum, wedging the workpiece against the y-axis datum;
   (iii) rotates the primary z-axis clamp toward the workpiece, clamping the workpiece against the floor;

(e) wherein the x-axis wedge is connected to the rod of the primary linear actuator; and (f) wherein the primary z-axis clamp is attached to a cam with a pinion gear that engages a rack gear connected to the rod of the primary linear actuator.

2. The platform of claim 1, wherein:
   (a) the primary y-axis wedge includes a spring and a bearing; and
   (b) the bearing is in contact with a sloped ramp attached to the rod of the primary linear actuator.

3. The platform of claim 2, wherein the sloped ramp is adjustable.

4. The platform of claim 1, wherein the x-axis datum and the y-axis datum are adjustably fixable on the x-y stage.

5. The platform of claim 1, wherein upon the extension of the primary linear actuator, the workpiece is clamped by the primary z-axis clamp after both:
   (a) the workpiece is wedged against the x-axis datum; and
   (b) the workpiece is wedged against the y-axis datum.

6. The platform of claim 1, wherein upon the retraction of the primary linear actuator, the workpiece is released by the primary z-axis clamp before both:
   (a) the workpiece is released from the x-axis datum; and
   (b) the workpiece is released from the y-axis datum.

7. The platform of claim 1, further comprising a secondary constraint mechanism with a secondary z-axis clamp and a secondary linear actuator, wherein:
   (a) extension of the secondary linear actuator rotates the secondary z-axis clamp away from the workpiece; and
   (b) retraction of the secondary linear actuator rotates the secondary z-axis clamp toward the workpiece, clamping the workpiece against the floor.

8. The platform of claim 1, further comprising:
   (a) an x-axis carriage connecting the x-y stage to the base, wherein activation of an x-axis actuator connected to the x-axis carriage moves the x-y stage parallel to the first axis; and
   (b) a y-axis carriage connecting the x-y stage to the base, wherein activation of a y-axis actuator connected to the y-axis carriage moves the x-y stage parallel to the second axis perpendicular to the first axis.

9. The platform of claim 1, wherein:
   (a) the primary linear actuator is connected to a controller unit;
   (b) the controller unit is capable of actuating a workpiece tool; and
   (c) the controller unit synchronizes actuation of the primary linear actuator and the workpiece tool.

* * * * *